(12) United States Patent
Archer et al.

(10) Patent No.: US 6,976,688 B2
(45) Date of Patent: Dec. 20, 2005

(54) MOUNTING ASSEMBLY FOR A VEHICLE SUSPENSION ARM

(75) Inventors: David W. Archer, Hortonville, WI (US); Brian K. Anderson, Oshkosh, WI (US)

(73) Assignee: Oshkosh Truck Corporation, Oshkosh, WI (US)

( * ) Notice: Subject to any disclaimer, the term of this patent is extended or adjusted under 35 U.S.C. 154(b) by 0 days.

(21) Appl. No.: 10/888,846

(22) Filed: Jul. 9, 2004

(65) Prior Publication Data

US 2005/0001400 A1    Jan. 6, 2005

Related U.S. Application Data

(63) Continuation of application No. 09/635,579, filed on Aug. 9, 2000, now Pat. No. 6,764,085.

(51) Int. Cl.[7] .............................................. B60G 3/04
(52) U.S. Cl. .............................. 280/124.134; 248/689; 280/124.135; 403/154; 403/155
(58) Field of Search .................. 280/124.134, 124.135; 248/689; 403/154, 155, 344

(56) References Cited

U.S. PATENT DOCUMENTS

| | | |
|---|---|---|
| 1,737,915 A | 12/1929 | Carrillo |
| 3,554,588 A | 1/1971 | Reinsma et al. |
| 3,868,193 A | 2/1975 | Schott |
| 4,190,378 A | 2/1980 | Stecklein |
| 4,813,704 A | 3/1989 | Smith |
| 4,887,927 A | 12/1989 | Bond |
| 4,943,081 A | 7/1990 | Golpe |
| 5,062,654 A | 11/1991 | Kakimoto et al. |
| 5,240,280 A | 8/1993 | Raidel |
| 5,312,199 A | 5/1994 | Smith, Jr. |
| 5,538,274 A | 7/1996 | Schmitz et al. |
| 5,820,150 A | 10/1998 | Archer et al. |
| 6,105,984 A | 8/2000 | Schmitz et al. |
| 6,516,914 B1 | 2/2003 | Andersen et al. |
| 6,520,494 B1 | 2/2003 | Andersen et al. |
| 6,561,718 B1 * | 5/2003 | Archer et al. ............... 403/155 |
| 6,764,085 B1 * | 7/2004 | Anderson ............ 280/124.134 |

FOREIGN PATENT DOCUMENTS

| | | |
|---|---|---|
| EP | 0 410 675 B1 | 12/1993 |
| EP | 1 164 074 A2 | 12/2001 |
| GB | 218 114 | 7/1924 |
| GB | 429596 | 5/1935 |
| GB | 947853 | 1/1964 |
| GB | 1 286 229 | 8/1972 |
| GB | 2 147 553 A | 5/1985 |
| GB | 2 230 237 A | 10/1990 |
| GB | 2 277 304 A | 10/1994 |
| JP | 2001-140964 | 5/2001 |

* cited by examiner

Primary Examiner—Eric Culbreth
(74) Attorney, Agent, or Firm—Foley & Lardner LLP

(57) ABSTRACT

A mounting assembly for use with a mounting surface includes an arm, a pin, a pair of clamping blocks and a fastener. The arm has a cylindrical bore at one end. The pin extends through the bore. Each block of the pair of clamping blocks includes a central opening and is circumferentially discontinuous about the central opening. Each clamping block further includes a slot defined by portions of the block. The slot is dimensioned to allow the pin to pass through the slot when the block is in an unclamped position and to tightly grip the pin when the block is in a clamped position. The fasteners extend across the slots and are configured to engage the mounting surface to mount the blocks to the mounting surface.

7 Claims, 14 Drawing Sheets

MOUNTING ASSEMBLY FOR A VEHICLE SUSPENSION ARM

CROSS-REFERENCE TO RELATED PATENT APPLICATIONS

This application is a continuation application of U.S. application Ser. No. 09/635,579, now U.S. Pat. No. 6,764,085, from which priority is claimed under 35 U.S.C. §120. The full disclosure, in its entirety, of U.S. application Ser. No. 09/635,579 is hereby incorporated by reference.

BACKGROUND

The present invention relates to large vehicles having independent suspensions, such as those which are typically used in military applications and in large municipal vehicles, such as fire trucks. In particular, the invention relates to a frame and independent suspension assembly which allows a vehicle to have better stability by lowering the center of gravity, and better visibility because of the lower drivetrain and lower hoodline.

Military and other emergency vehicles must be designed to extremely demanding specifications. The vehicles must be capable of driving over or through obstacles which only a tactical or emergency driver would attempt. The vehicles must be able to endure corrosive, partially submerged and frequently dirty environments, such as standing water, chemicals or deep mud.

In addition, it is desirable for such vehicles to provide maximum forward visibility for the operator and maximum load carrying capacities. One step which has been taken in the design of heavy duty vehicles has been to utilize C-shaped channels as the main frame members. The use of two widely-spaced beams provides a space where various engine, transmission and other essential components can be mounted. Making more space available along the center line of the vehicle frame allows heavy components to be more effectively mounted at lower elevation which, in turn, lowers the vehicle's center of gravity. Vehicles with low centers of gravity have improved stability. A lower center of gravity in a vehicle provides improved resistance to overturning as the vehicle traverses rough terrain or maneuvers around obstacles at high rates of speed. The improved visibility that results from a lowering of a vehicle[']s drive train and hoodline allows for safer operation of the vehicle. While the present invention has particular application in the context of frame members which are C-shaped, the invention may be used with frame members having other shapes, such as tubular shapes (rounded and rectangular) and other structurally advantageous shapes.

SUMMARY OF THE INVENTION

The present invention provides a mounting assembly for a rotating arm, such as a control arm of an independent suspension. The present invention provides for easy removal of a pin in the mounting assembly, which in turn allows for easy replacement of the control arm of a vehicle suspension. These and other advantages are accomplished by using a pin which passes through a cylindrical bore in one end of the arm. The pin is gripped at each end by a clamping block. Each block has a main pin-gripping opening for one end of the pin, and the opening has an initial size which allows the end of the pin to pass easily through the opening. However, when the clamping block is tightened, such as by mounting the block to a support, the opening is made smaller so as to grip the end of the pin.

Other features and advantages of the present invention will be better understood upon a reading of the following specification, read together with the accompanying drawings, wherein:

DETAILED DESCRIPTION OF THE PREFERRED EMBODIMENTS

Figure 1:
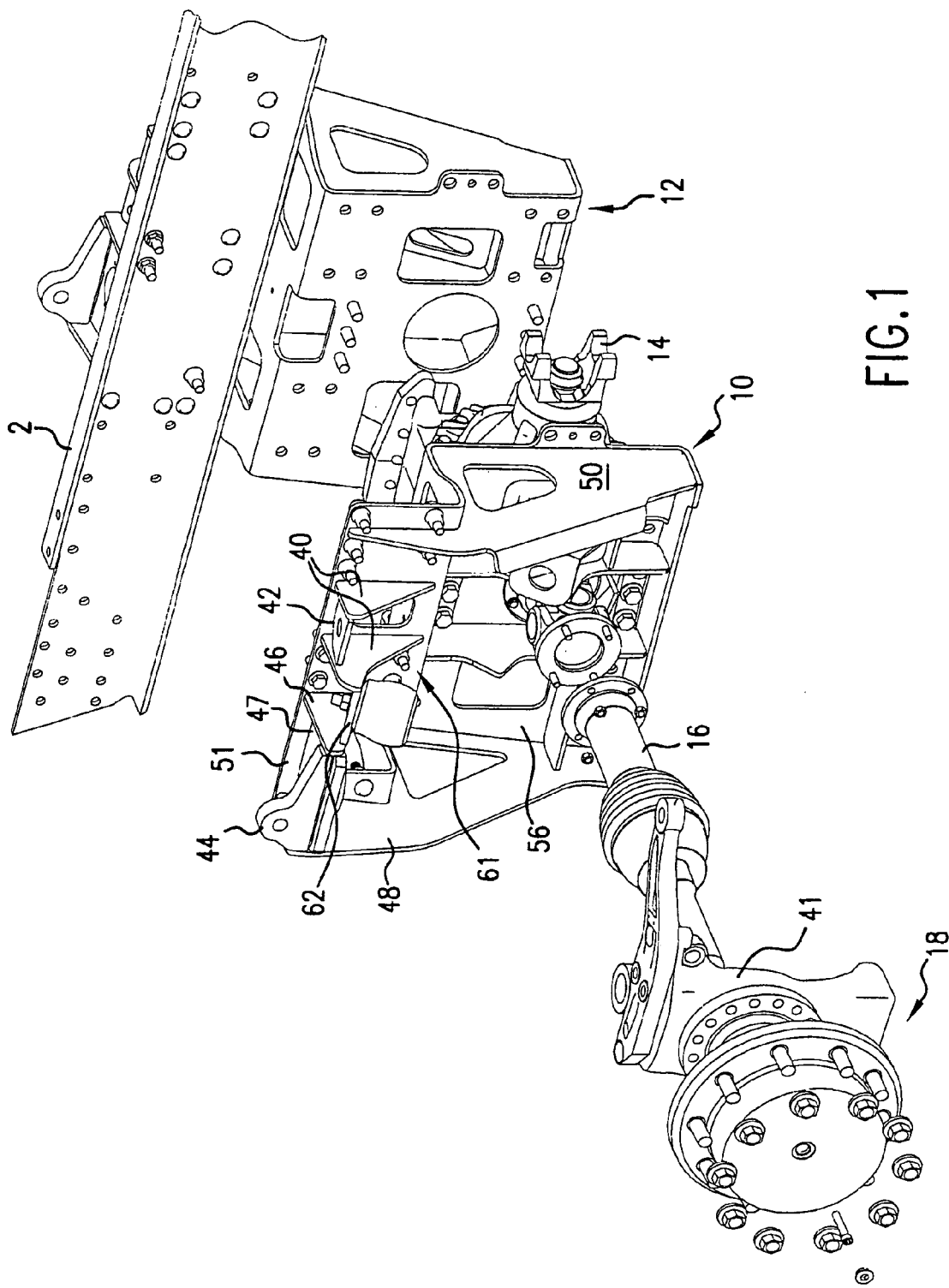
FIG. 1 is a perspective view of a pair of weldments and portions of an axle constructed in accordance with the present invention.

FIG. 1 shows the front portion of a vehicle and its suspension support in relation to a frame rail 2 of a vehicle. A left-hand or first side plate 10 is mounted beneath a left-hand frame rail (not shown), and a right-hand or second side plate 12 is mounted beneath a right-hand frame rail 2. Several bolts are used to connect each of the side plates 10 and 12 to its respective frame rail. A differential 15 with a differential drive connection 14 is connected to each of the side plates 10 and 12. As further shown in FIGS. 2 and 3, it is clear that the main side plates 10 and 12 are joined together by the lower plate 20, bar 22 and differential 15 at the lower portions of the side plates 10 and 12. The side plates shown in FIGS. 1 through 6 are for a suspension which is not equipped with an anti-sway bar.

Referring now to the first plate 10 shown in FIGS. 1 through 6, it is comprised of three main components which are welded together. Those components are: a longitudinally extending main plate member 51; a leading end plate 48; and a trailing end plate 50. Longitudinally extending plate member 51 includes four sections: an upper vertical plate section 52; a horizontal plate section 54; a lower vertical plate section 56; and a lower lip 58. The upper vertical plate section 52 and the lower vertical plate section 56 are in an off-set and generally parallel relationship. Extending from the outer face of the upper vertical plate section 52 are three pockets including a shock absorber pocket 38 formed by gusset plates 40 and a bearing plate 42, a jounce bumper pocket 61 formed by gusset plates 40 and 46 and jounce bumper plate 62, and a coil spring pocket 39, defined by the end plate 48, gusset plate 46 and coil spring bearing plate 47. A lifting lug 44 may be welded to the bearing plate 47 for use in lifting the complete vehicle. The lower vertical plate section 56 has an opening 70 so that a half-shaft 16 can extend from the differential 15 to the wheel end 18 (see FIG. 1).

Figure 2:
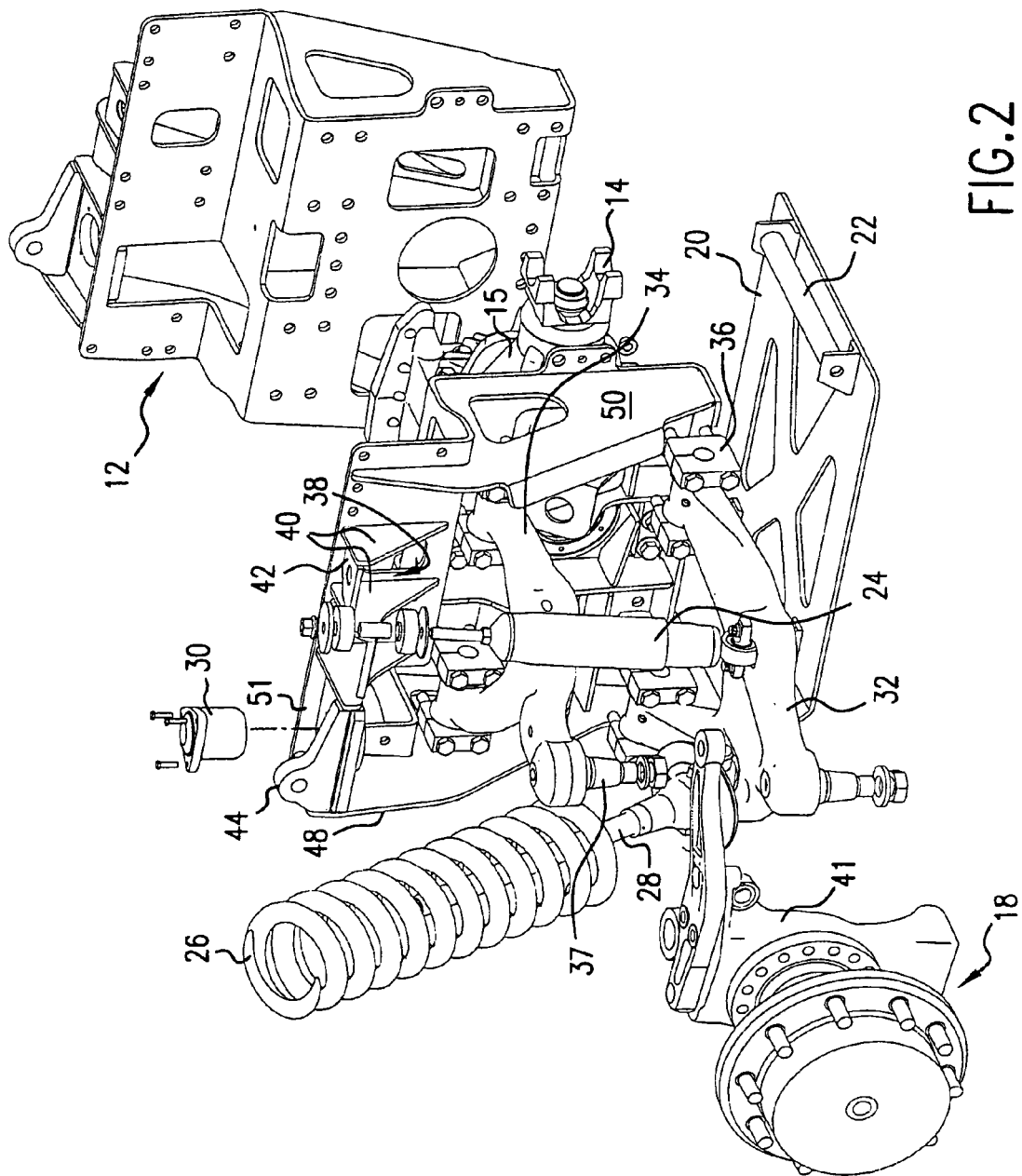
FIG. 2 is a second perspective view of the weldments shown in FIG. 1 with other suspension components shown adjacent thereto.
Figure 3:
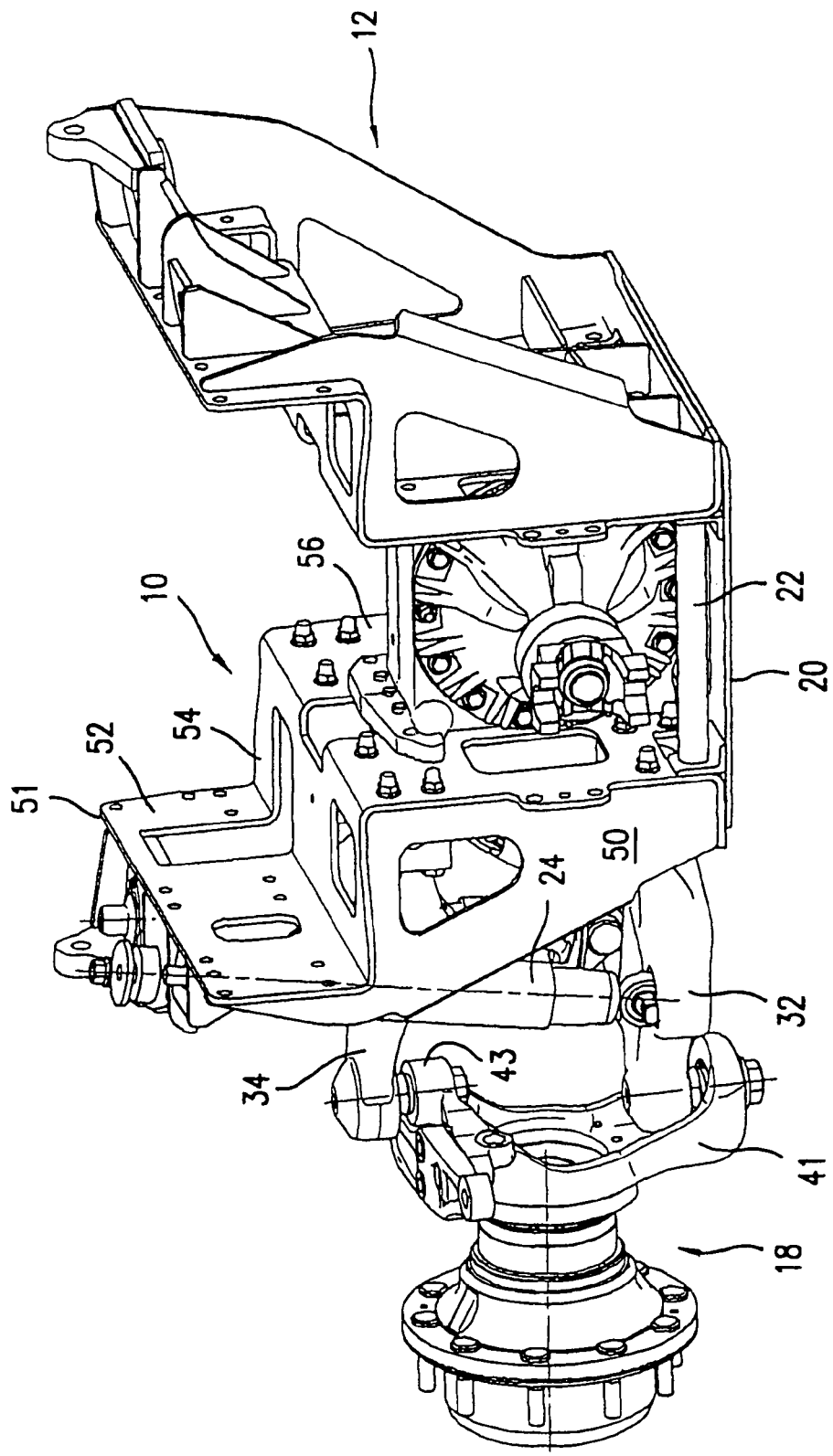
FIG. 3 is a third perspective view of the weldments shown in FIGS. 1 and 2.
Figure 4:
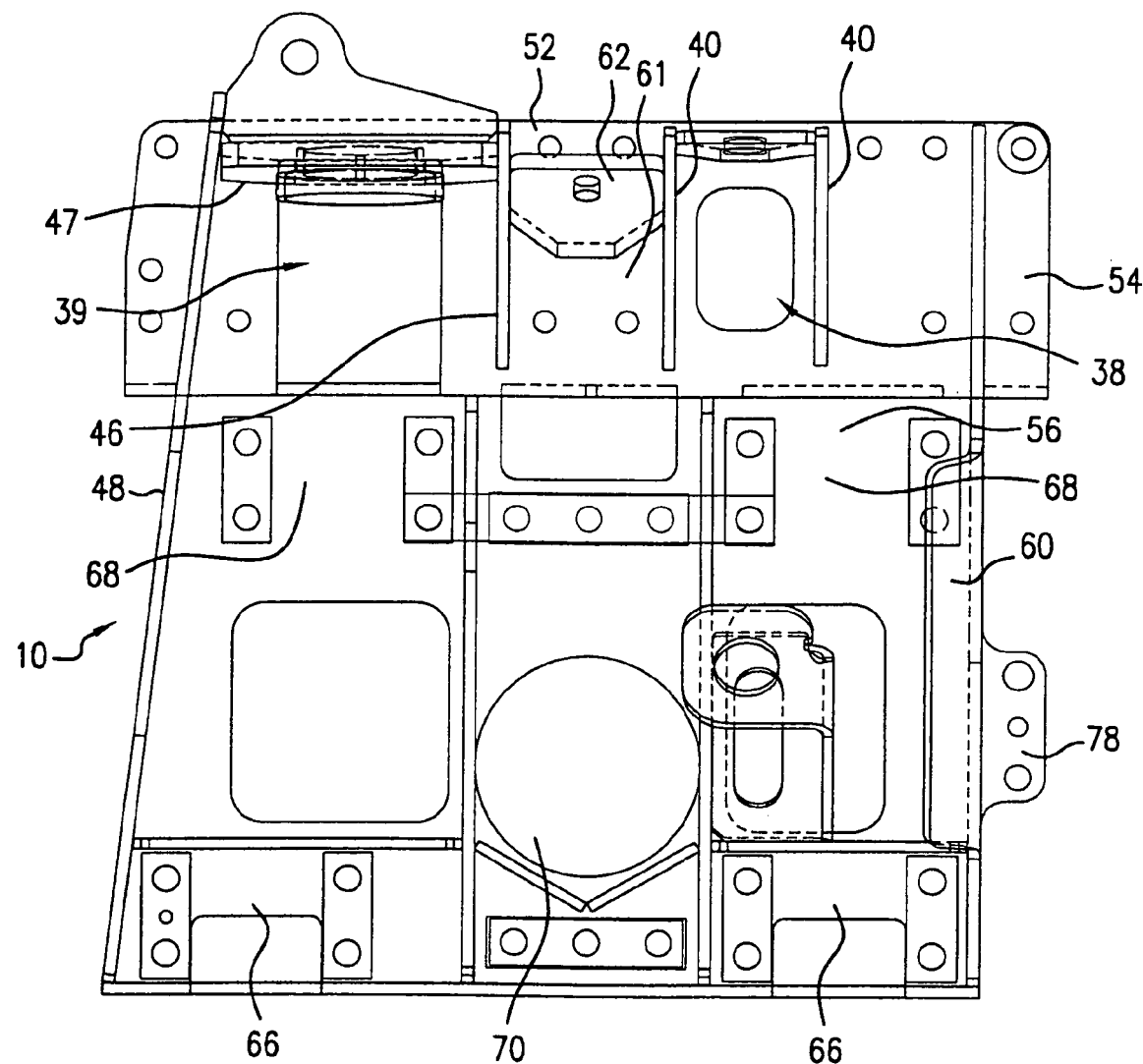
FIG. 4 is a side-elevational view of a front left-hand weldment of the present invention as configured with no anti-sway bar.
Figure 5:
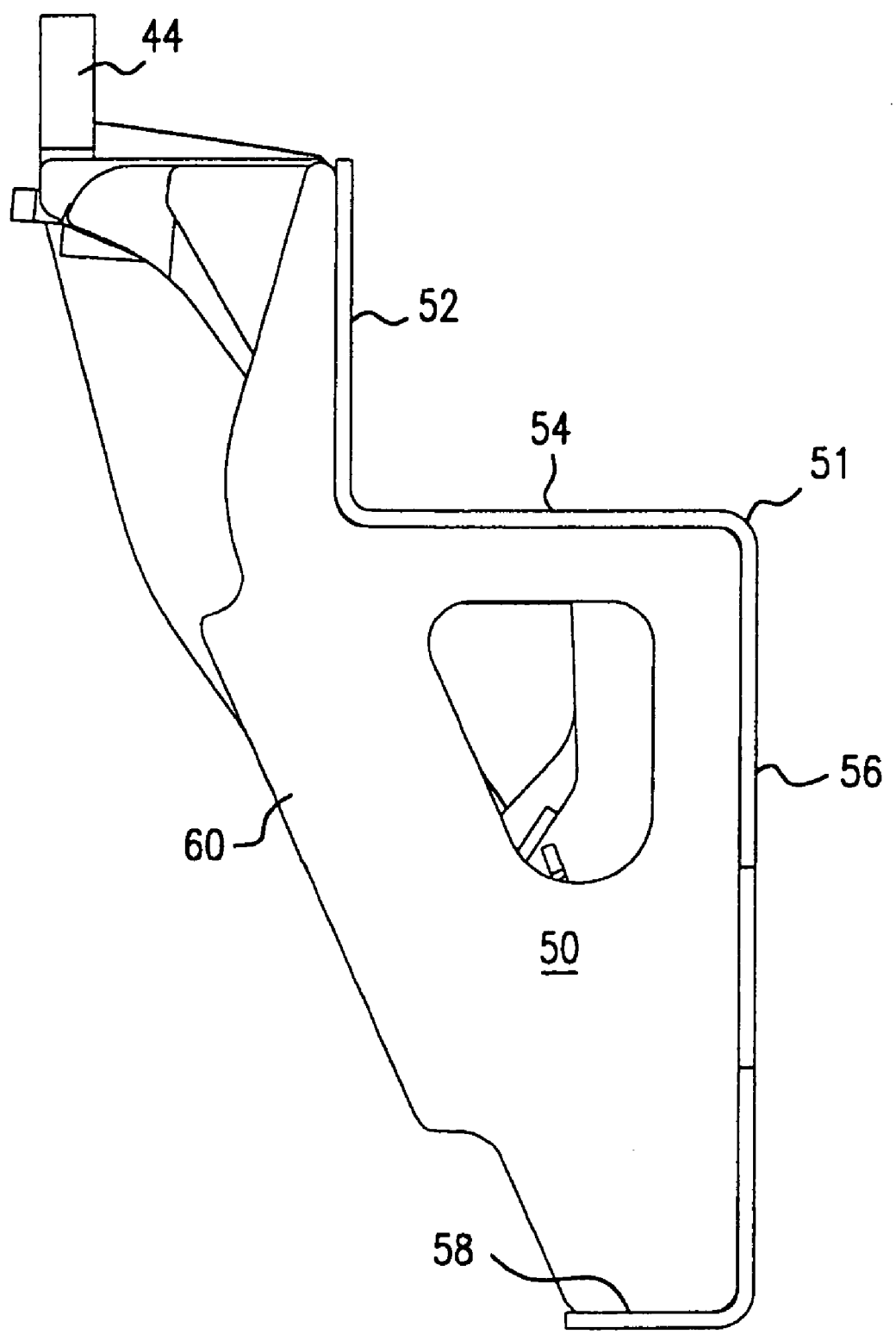
FIG. 5 is an end view of the weldment shown in FIG. 4.
Figure 6:
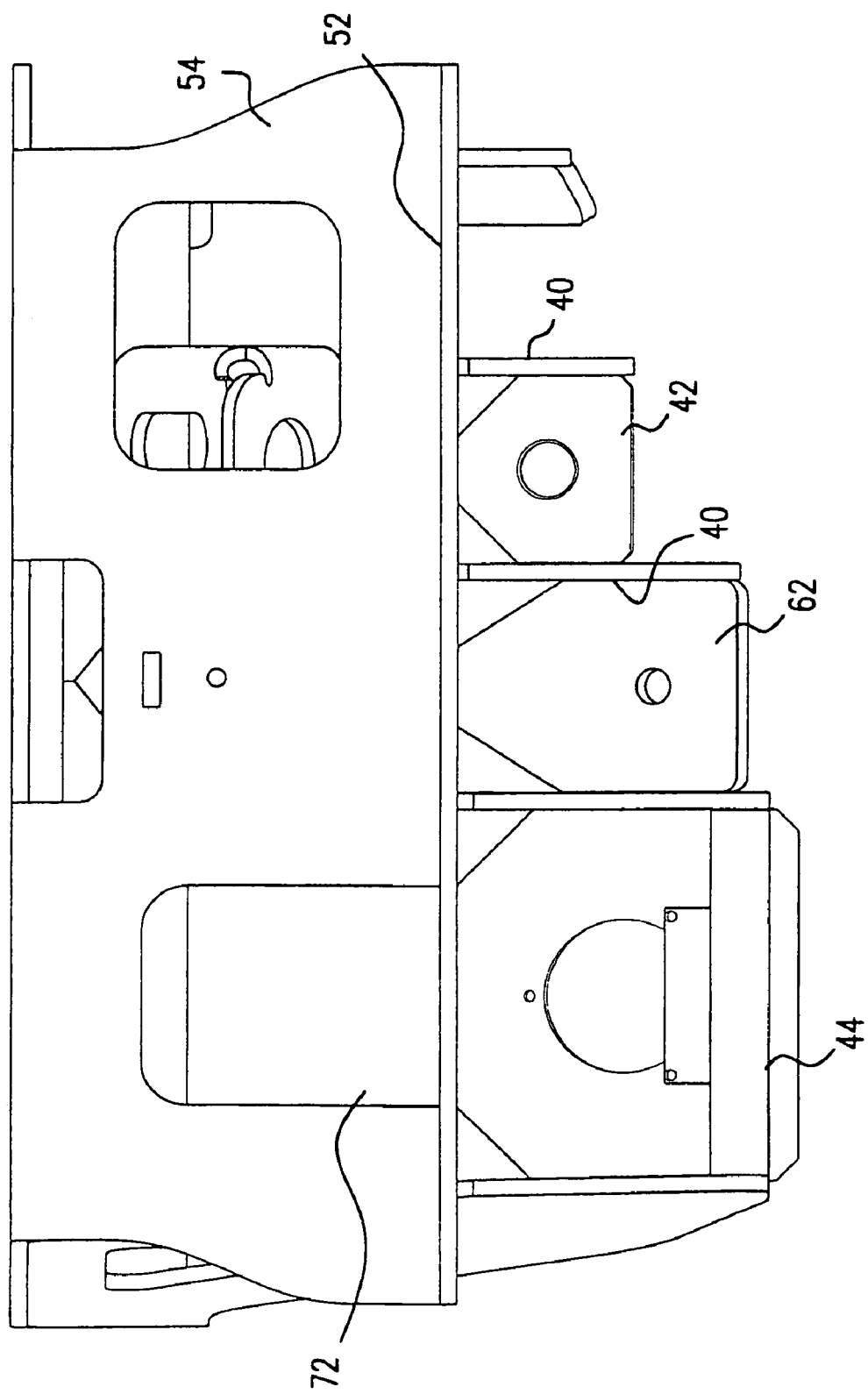
FIG. 6 is a top plan view of the weldment shown in FIGS. 4 and 5.

As is most clearly shown in FIG. 2, the elements of the suspension system are connected to the outer portions of the first side plate 10. The shock absorber 24 extends from the bearing plate 42 to the lower control arm 32. Similarly, the suspension coil spring 26 extends from the lower control arm 32 to the bearing plate 47. In addition, inside the suspension coil spring 26, a spring guide 28 extends from the lower control arm 32 into the spring guide bushing 30 which is bolted to the coil spring bearing plate 47. An upper control arm 34 is connected by a ball joint 37 to an upper portion of the steering knuckle 41. The upper and lower control arms 34 and 32, respectively, are held in place by four control arm mounting assemblies 94, an example of which is more clearly shown in FIG. 10 discussed below. The locations of the control arm mounting assemblies for a left-hand side plate 10 can best be seen in FIG. 4 wherein upper control arm attachment locations 68 and lower control arm attachment locations 66 are at upper and lower portions of the vertical mounting plate 56. An ear 78 is used to support various system lines, i.e., hoses or wires, etc., which lead to the wheel end 18. A stiffening flange 60 extends from the outer edge of the end plate 50 to provide the plate 50 with increased resistance to buckling.

Figure 7:
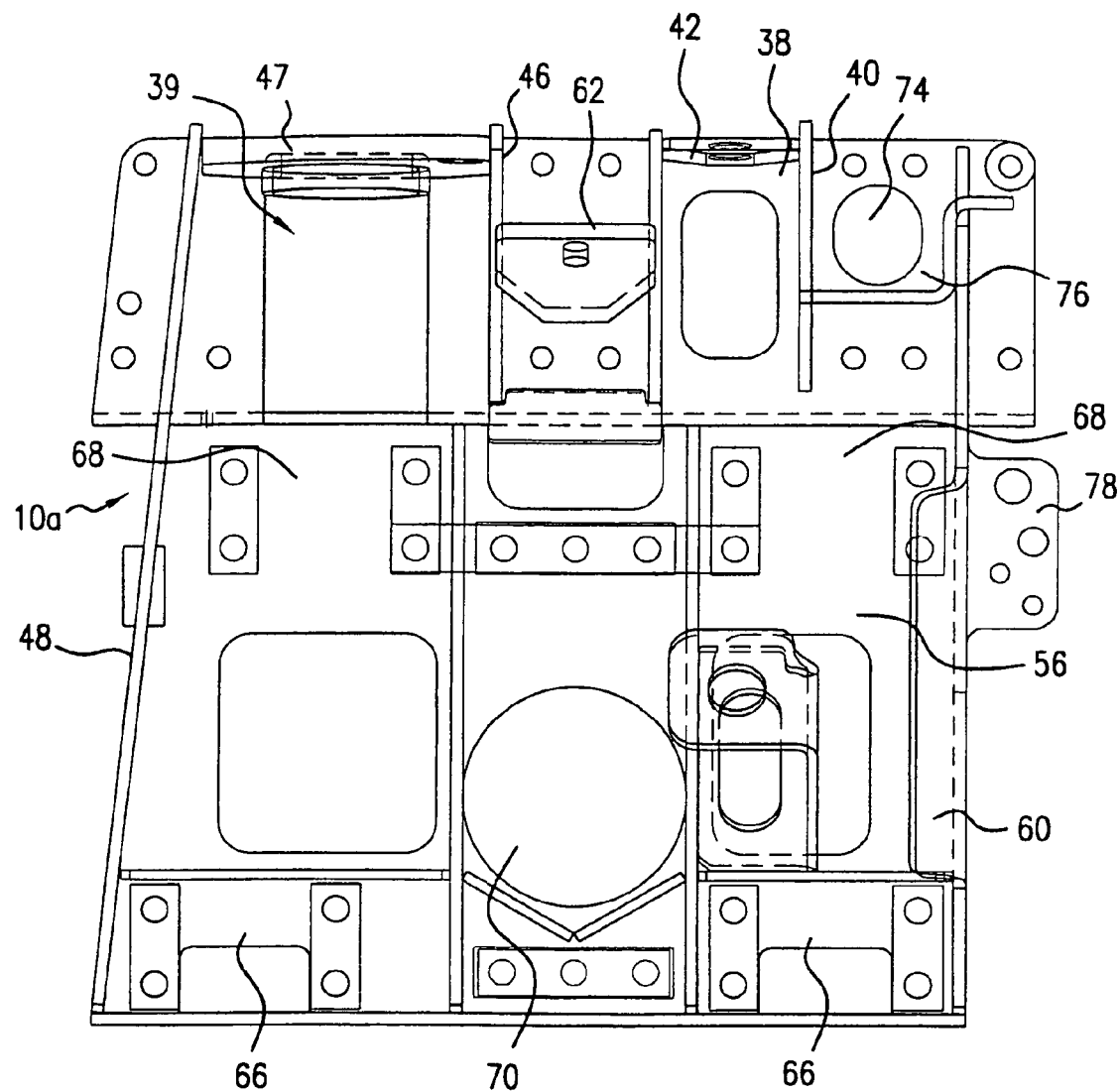
FIG. 7 is side-elevational view of a rear left-hand weldment of the present invention as configured for use with an anti-sway bar.
Figure 8:
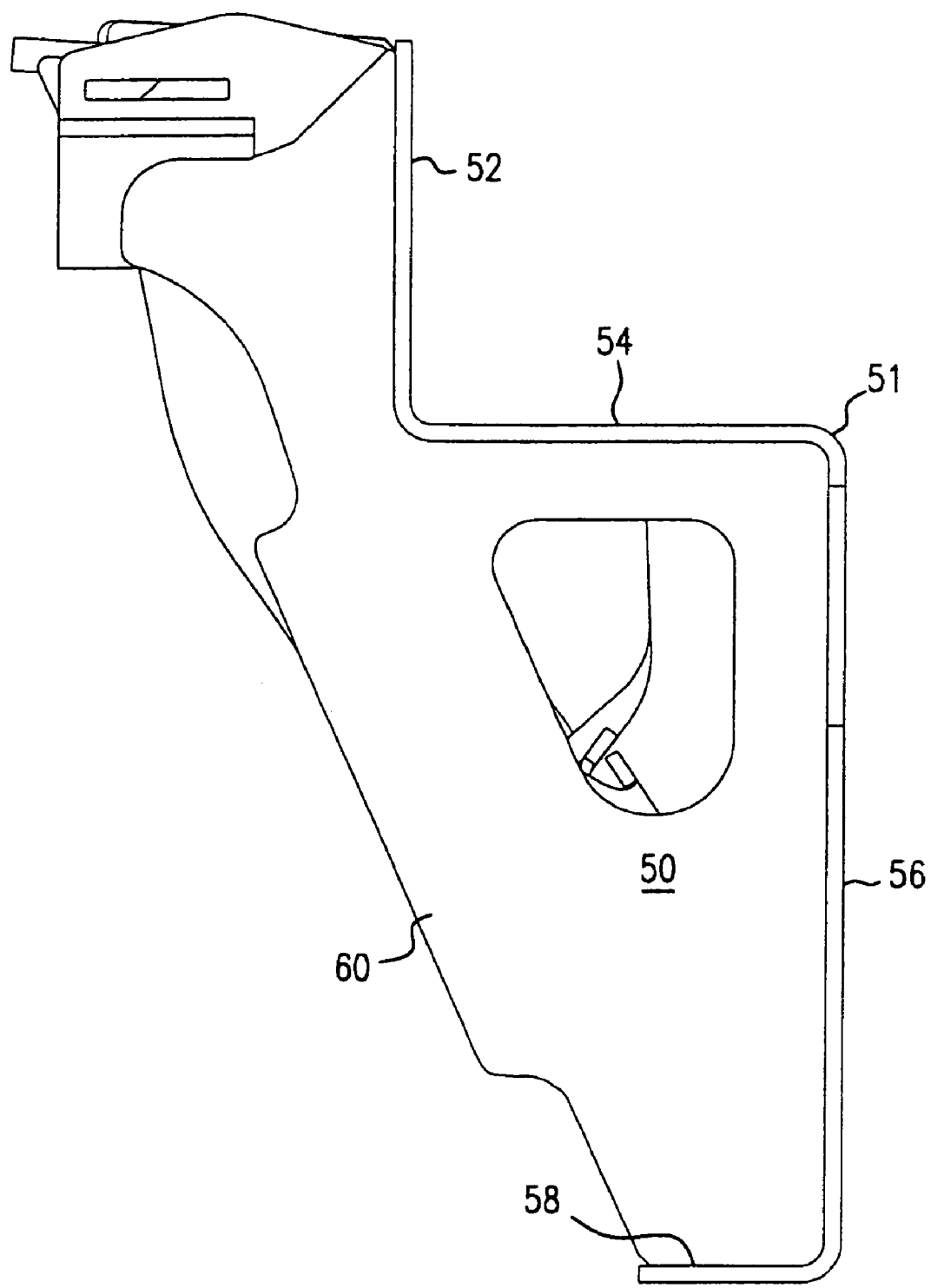
FIG. 8 is an end view of the weldment shown in FIG. 7.
Figure 9:
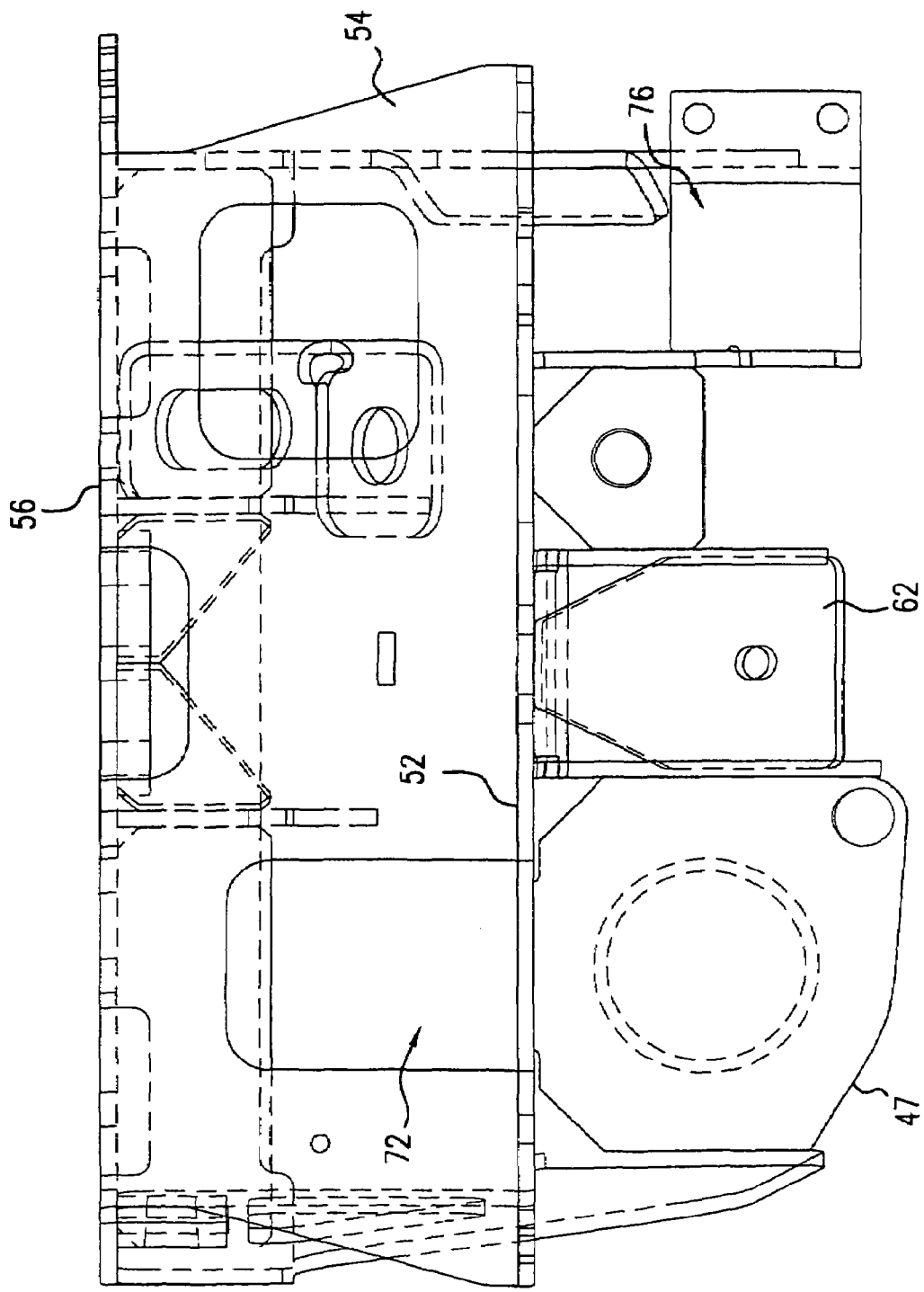
FIG. 9 is a top plan view of the weldment shown in FIGS. 7 and 8.

FIGS. 7, 8 and 9 show a left-hand side plate 10a for use with an anti-sway bar. In describing the anti-sway bar equipped left-hand side plate 10a, the same reference numerals used to indicate portions of the side plate 10 are used for components which are the same. For example, a coil spring bearing plate 47 extends between an end plate 48 and a gusset 46 to define a pocket 39 for a coil spring (not shown in FIG. 7). The left-hand side plate 10a includes upper control arm mounting locations 68 and lower control arm mounting locations 66. Gusset plates 40 and shock absorber bearing plate 42 define a shock absorber pocket 38. However, an element which is part of the left-hand side plate 10a, which is not included in the front side plate 10 is a bushing pocket 76 and an opening 74 through which extends an anti-sway bar 112, more details of which are shown in FIG. 12.

Figure 10:
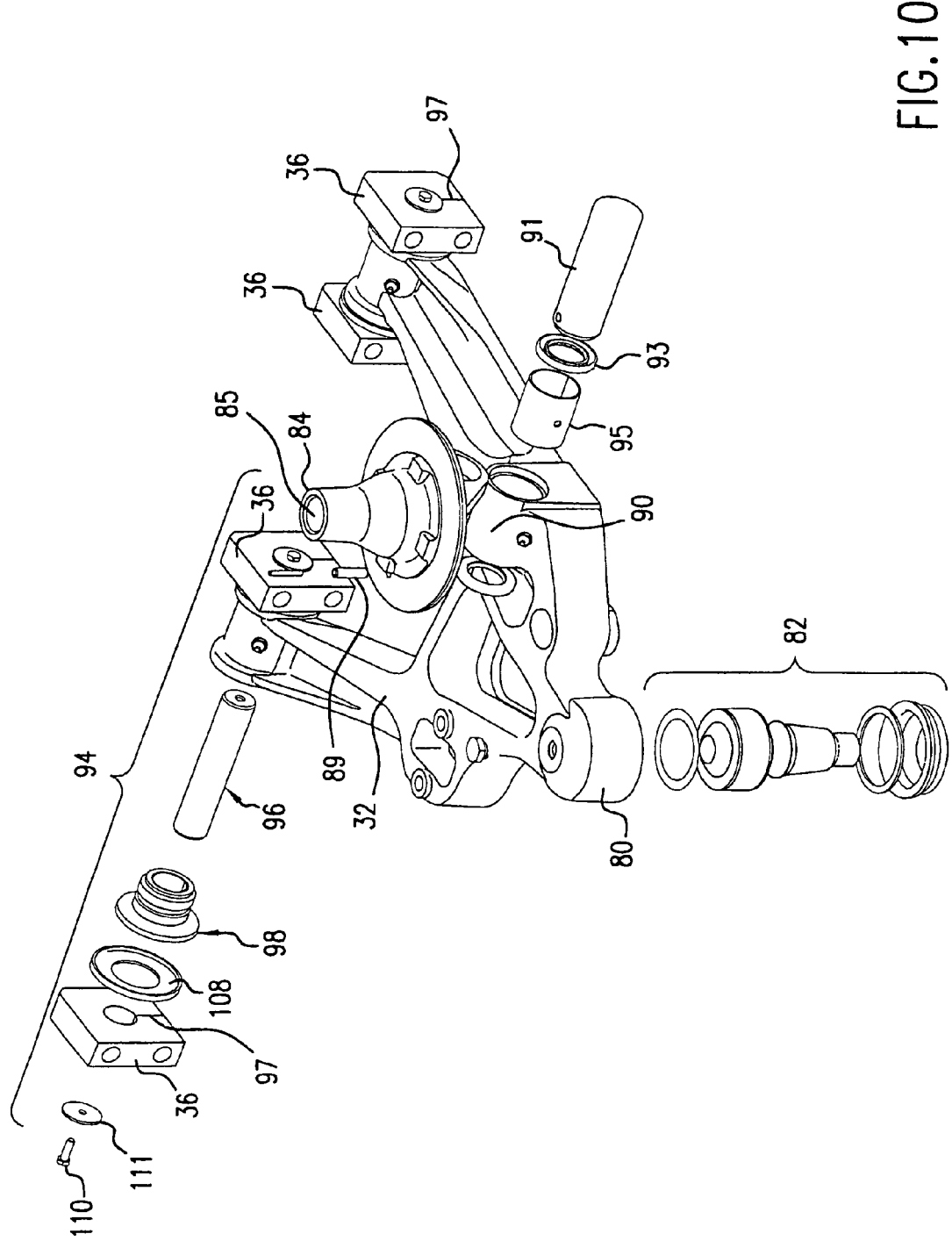
FIG. 10 is an exploded perspective view of a lower control arm constructed in accordance with the present invention.
Figure 11A:
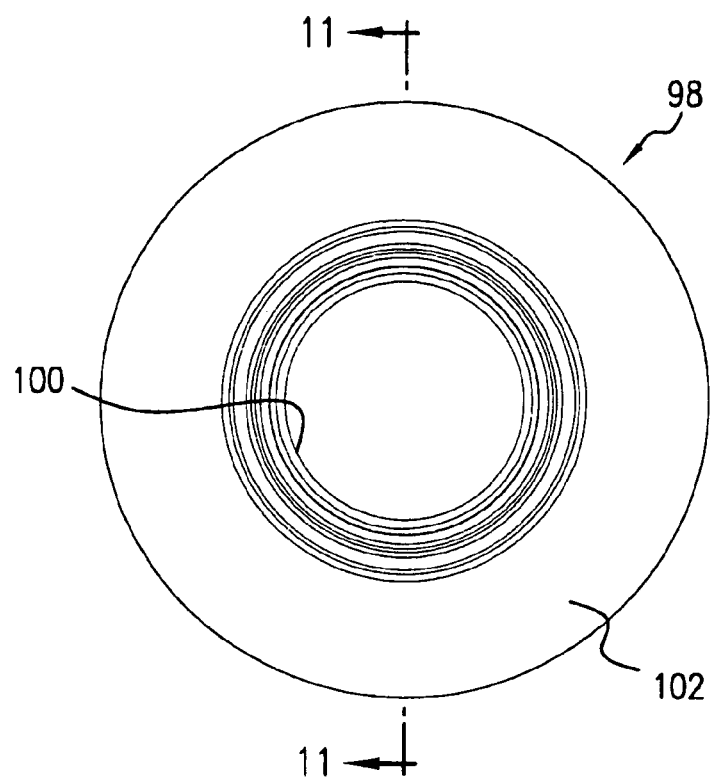
FIG. 11A is a top view of a bushing assembly of the control arm of the present invention.
Figure 11:
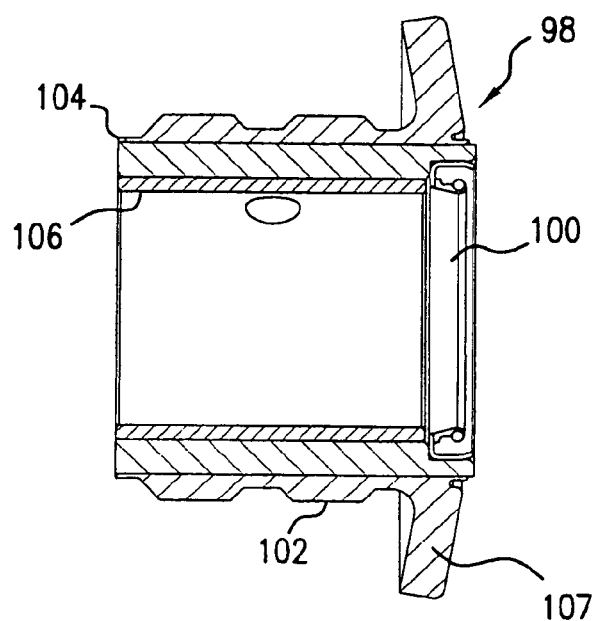
FIG. 11 is a cross-sectional view of a bushing assembly of the control arm of the present invention taken along line 11—11 in FIG. 1A.

FIG. 10 is an exploded view of a lower control arm assembly. The lower control arm 32 has two control arm mounting assemblies 94, one of which is shown in exploded form on the left side of FIG. 10. The lower control arm 32 has a longitudinal axis and a cylindrical bore at one end of the lower control arm 32. The cylindrical bore has an axis transverse to the lower control arm longitudinal axis. The control arm mounting assembly 94 includes a pin 96 and two bushing assemblies 98 (more detail of which is shown in FIG. 11). The ends of the pin 96 are clamped by the blocks 36 as the blocks 36 are attached to the lower vertical plate section 56 of a side plate. Each of the blocks 36 has a central opening and is circumferentially discontinuous about its central opening. The pin 96 has a length greater than the sum of the lengths of the bushings 98 whereby the pin 96 when passing through the bushings 98 has exposed ends grippable by the clamping blocks 36. The pin 96 can have a threaded bore at each end. The clamping blocks 36 each have aligned holes through which bolts may pass, with tightening of the bolts causing the slots 97 to close and the blocks 36 to grip the pin 96. The aligned holes may be unthreaded. A thrust washer 108 is disposed between each bushing assembly 98 and a block 36. A screw 110 and washer 111 are used to properly pre-load the bushing 98 before installation. These fasteners are threadably engageable in the threaded bore of the pin 96. The lower control arm 32 includes a spring mount 90 through which there extends a spring pivot pin 91 and a sleeve bearing 95. A spring seat 84 with a threaded hole 85 for receiving the spring guide 28 straddles the spring mount 90. A small dowel pin 89 retains the pin 91 in the spring seat 84 and causes the spring seat 84 to rotate the spring pivot pin 91 within the sleeve bearing 95. A pair of seals 93 prevent contaminants from entering the sleeve bearing 95 within the spring mount 90. FIG. 10 also shows a ball joint assembly 82, which is housed within a socket 80 on the outer end of the lower control arm 32.

FIG. 11 is an enlarged cross-sectional view of the bushing assembly 98 which is part of the control arm mounting assembly 94. The bushing assembly 98 includes an inner sleeve bearing 106, an intermediate metal sleeve 104 and an outer elastomeric sleeve 102 which has a flange 107 at one end and annular ribs and grooves on the outside surface thereof. A seal 100 engages a shoulder formed on the outer edge of the intermediate sleeve 104. The bushing assembly 98 fits snugly into a bore formed at the inside end of each leg of the lower control arm 32. As the block 36 is tightened into position against the lower vertical plate section 56 of a side plate, the pin 96 is gripped by the block 36 as a result of the closing of the gap formed by the slot 97 in the block 36. A slot in each block 36 of a control arm mounting assembly allows for easy removal of a pin 96 from the assembly 94. Arranging the slots 97 so that they face down makes it harder for water and mud to flow into the pin/block joint.

Figure 12:
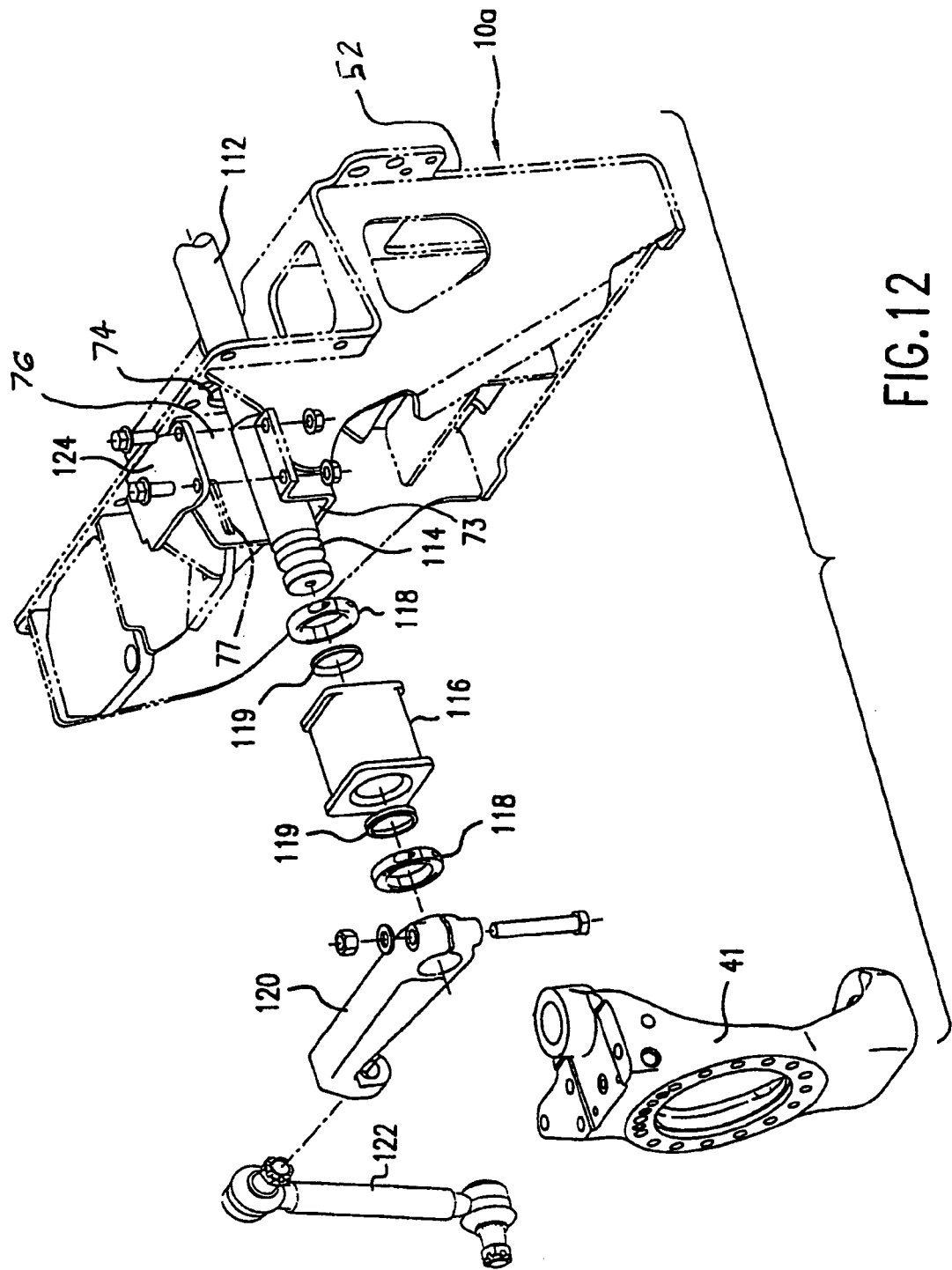
FIG. 12 is an exploded perspective view of an anti-sway bar assembly made in accordance with the present invention.

FIG. 12 shows the anti-sway assembly which forms a part of the present invention. An anti-sway bar 112 has a splined end 114 and extends through the opening 74 in the upper vertical plate section 52 of a side plate 10a. The anti-sway bar 112 is supported by a bushing 116. The bushing 116 is contained in a pocket 76, the top portion of which is formed by a removable plate 124. One end of the plate 124 is inserted into a slot 77 formed in a gusset plate 40, and the other end of the plate 124 is held in place by bolts. A pair of collars 118 maintain the position of the anti-sway bar 112 in the bushing 116. A pair of seals 119 prevent contaminants from entering the bushing 116. The splined end 114 of the anti-sway bar 112 is engaged in and clamped by an end of the arm 120. A vertical link 122 connects an end of the arm 120 to the steering knuckle 41.

Figure 13:
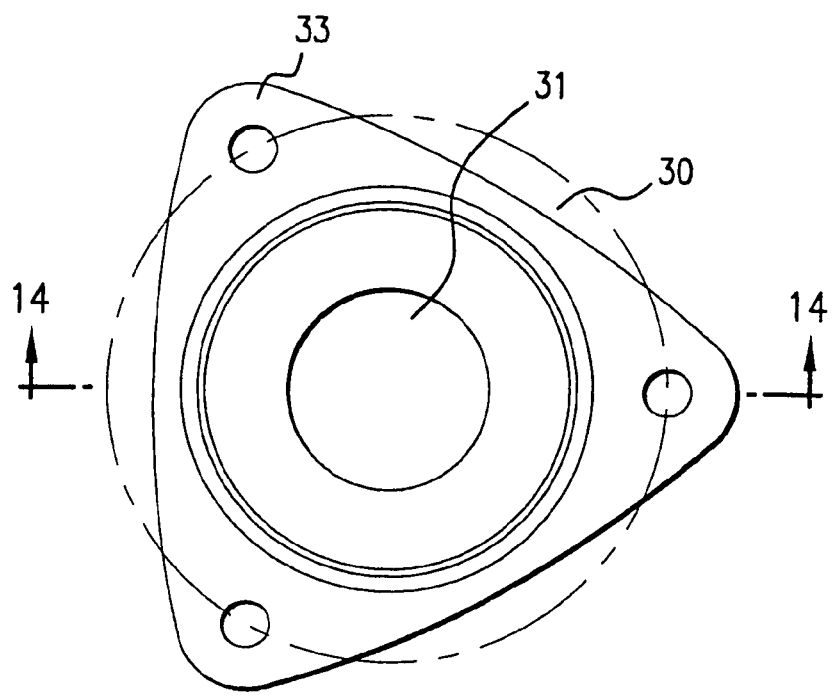
FIG. 13 is an end view of the spring guide bushing shown in FIG. 14 made in accordance with the present invention.
Figure 14:
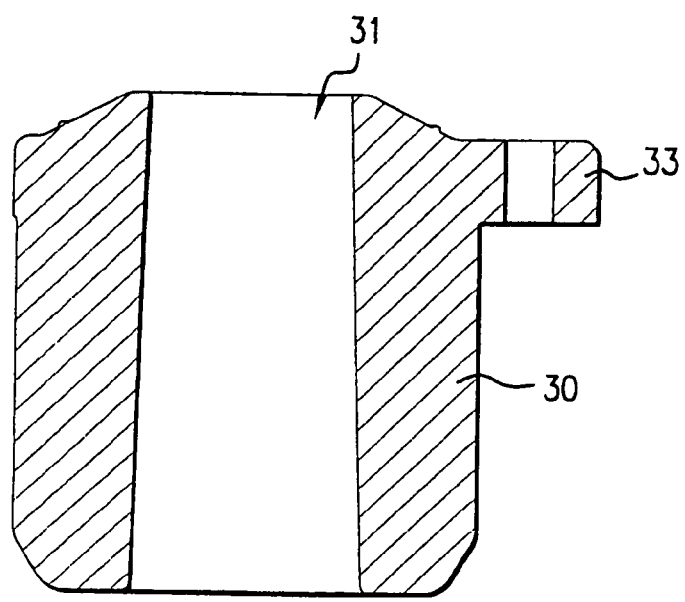
FIG. 14 is a cross-sectional view taken along line 14—14 in FIG. 13 and showing a bushing for a spring guide.
Figure 15:
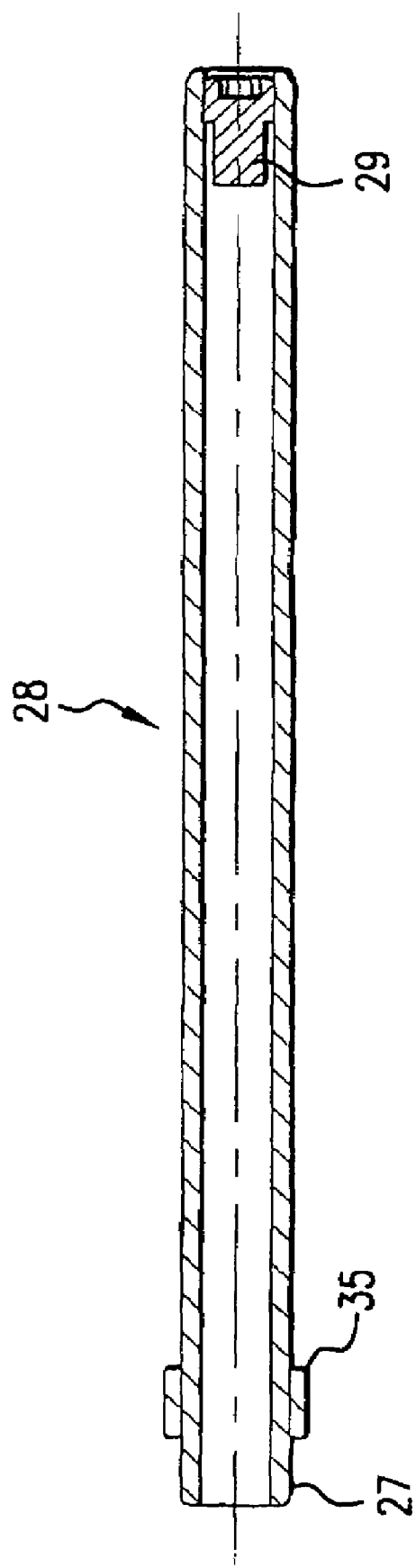
FIG. 15 is a longitudinal cross-section through a spring guide made in accordance with the present invention.

FIGS. 13 and 14 show the spring guide bushing 30 which is attached to the coil spring bearing plate 47 on the front side plates 10 and 12. The spring guide bushing 30 includes a tapered bore or opening 31 through which a spring guide 28 extends. The taper allows the spring guide 28 to articulate slightly within the bushing 30. Mounting ears 33 facilitate the connection of the bushing 30 to the bearing plate 47. The bushing 30 is mounted in the orientation shown in FIG. 2 so that the narrower end of the tapered opening 31 is upward, i.e., the bushing 30 extends down into and through the opening in the bearing plate 47. The rear spring is stable enough by itself not to need a guide. The spring guide 28 is shown in FIG. 15. The spring guide 28 has a threaded end 27 which threads into the threaded hole 85 in the spring seat 84.

(See FIG. 10.) A stop 35 is welded to the body of the spring guide 28 to limit the threaded engagement of the threaded end 27 and the spring seat 84. At the opposite end of the spring guide 28 a drive socket 29 is incorporated to facilitate the threaded engagement of the spring guide 28 into the spring seat 84 with a common wrench. It should be noted that the diameter of the spring guide 28 is substantially smaller than the inside diameter of the coil spring 26 through which it extends. The result is a non-contact spring guide. The spring guide 28 is free to slide within the tapered opening 31 in the spring guide bushing 30 as the wheel of a vehicle moves up and down. The alignment of the spring seat 84, however, is maintained so that buckling of the coil spring 26 is prevented, even in instances where there is a large compression of the spring as a result of relative movement of the wheel and the frame.

Having described a number of features, discoveries and principals embodied in the foregoing examples, it is intended and will be understood by those skilled in the art, that a number of modifications, alternatives and variations thereof may be made while still incorporating the spirit and scope of the inventions as claimed below.

What is claimed is:

1. A mounting assembly for use with a mounting surface, the assembly comprising:
    an arm with a first cylindrical bore at one end of said arm;
    a first pin extending through said first bore;
    a pair of first clamping blocks, each first block having a first central opening, each first clamping block being circumferentially discontinuous about said first central opening and having a first slot defined by portions of said first block, said first slot being dimensioned to allow said first pin to pass through said first slot when the first block is in a first unclamped position and to tightly grip said first pin when the first block is in a second clamped position;
    first fasteners extending across the first slots and configured to engage the mounting surface to mount the first blocks to the mounting surface.

2. A mounting assembly in accordance with claim 1 wherein:
    portions of each block defining said first slot have aligned holes through which the first fasteners may pass, whereby tightening of said first fasteners causes said slots to close and said blocks to grip said pins, said assembly including a pair of bushings,
    said bushings being disposed in said first cylindrical bore of said arm,
    said first pin having a length greater than the sun of the lengths of said bushings whereby said pin when passing through said bushing has exposed ends grippable by said first clamping blocks,
    said bushings having an inner sleeve bearing and an outer elastomeric flanged sleeve and an intermediate sleeve therebetween with a seal at an outer end of said intermediate sleeve,
    said flanged sleeve having a flange at an outer end thereof,
    said pin has a threaded bore at each end,
    a threaded fastener being threadably engageable in said threaded bore,
    and said threaded fastener connecting with a washer to pre-load said pin between said clamping blocks when said clamping blocks grip said pin.

3. The mounting assembly of claim 1 wherein the pin extends along an axis and wherein the arm rotates relative to the clamping block about the axis.

4. The mounting assembly of claim 1 including a pair of opposing fasteners, one at each end of the first pin.

5. The mounting assembly of claim 1 wherein each slot is configured to extend in a downward direction when the pair of first clamping blocks are mounted to the mounting surface.

6. The mounting assembly of claim 1 wherein the first fasteners are configured to threadably engage the mounting structure.

7. The assembly of claim 1 wherein the arm includes:
    a second cylindrical bore at said one end of said arm;
    a second pin extending through the second bore;
    a pair of second clamping blocks, each second block having a second central opening, each second clamping block being circumferentially discontinuous about the second central opening and having a second slot defined by a portion of said second block, said second slot being dimensioned to allow said second pin to pass through said second opening when the second block is in a first unclamped position and tightly gripping said second pin when the second block is in a second clamped position; and
    second fasteners extending across each slot and configured to engage the mounting surface to mount the second blocks to the mounting surface.

* * * * *